United States Patent
Hayashi et al.

(10) Patent No.: US 7,398,991 B2
(45) Date of Patent: Jul. 15, 2008

(54) COVER COMPONENT OF AIRBAG SYSTEM, AIRBAG SYSTEM, AND VEHICLE INTERIOR TRIM

(75) Inventors: Shinji Hayashi, Shiga (JP); Masaru Morita, Moriyama (JP)

(73) Assignee: Takata Corporation, Tokyo (JP)

( * ) Notice: Subject to any disclaimer, the term of this patent is extended or adjusted under 35 U.S.C. 154(b) by 328 days.

(21) Appl. No.: 10/769,920

(22) Filed: Feb. 3, 2004

(65) Prior Publication Data

US 2004/0207181 A1   Oct. 21, 2004

(30) Foreign Application Priority Data

Apr. 15, 2003   (JP)   ............... 2003-110501
Sep. 9, 2003    (JP)   ............... 2003-317003

(51) Int. Cl.
*B60R 21/205*  (2006.01)
*B60R 21/20*   (2006.01)
*B60R 21/16*   (2006.01)

(52) U.S. Cl. .................... 280/728.3; 280/732
(58) Field of Classification Search .......... 280/728.3, 280/732
See application file for complete search history.

(56) References Cited

U.S. PATENT DOCUMENTS

| 5,013,065 | A |   | 5/1991 | Kreuzer |           |
| 5,060,971 | A | * | 10/1991 | Nanbu et al. | 280/728.3 |
| 5,143,401 | A | * | 9/1992 | Zushi | 280/731 |
| 5,152,548 | A | * | 10/1992 | Zushi | 280/728.3 |
| 5,174,602 | A | * | 12/1992 | Nakayama et al. | 280/728.3 |
| 5,180,187 | A | * | 1/1993 | Muller et al. | 280/732 |
| 5,195,773 | A |   | 3/1993 | Sawada et al. |  |
| 5,292,150 | A | * | 3/1994 | Watanabe et al. | 280/728.3 |
| 5,779,262 | A | * | 7/1998 | Totani et al. | 280/728.3 |
| 5,997,030 | A |   | 12/1999 | Hannert et al. |  |
| 6,113,131 | A |   | 9/2000 | Uchara et al. |  |
| 6,453,535 | B1 | * | 9/2002 | Nicholas | 29/413 |
| 2003/0107203 | A1 |   | 6/2003 | Bauer et al. |  |

FOREIGN PATENT DOCUMENTS

| EP | 0 963 806 A1 | 12/1999 |
| JP | 2-2000548 A | 8/1990 |
| JP | 11-170951 A | 6/1999 |
| JP | 11-334490 | 12/1999 |
| JP | 2001-80442 A | 3/2001 |

* cited by examiner

*Primary Examiner*—Christopher Bottorff
*Assistant Examiner*—Joselynn Y. Sliteris
(74) *Attorney, Agent, or Firm*—Foley & Lardner LLP

(57) ABSTRACT

A cover component mountable to an airbag system has a tear line that is torn open when an airbag of the airbag system inflates. At least part of the tear line includes a recessed line and hollows bored in the recessed line at intervals. The recessed line is molded into the cover component using a raised line provided on a core surface of a die, and where the hollows are bored into the cover component by laser processing.

2 Claims, 5 Drawing Sheets

[FIG. 1]
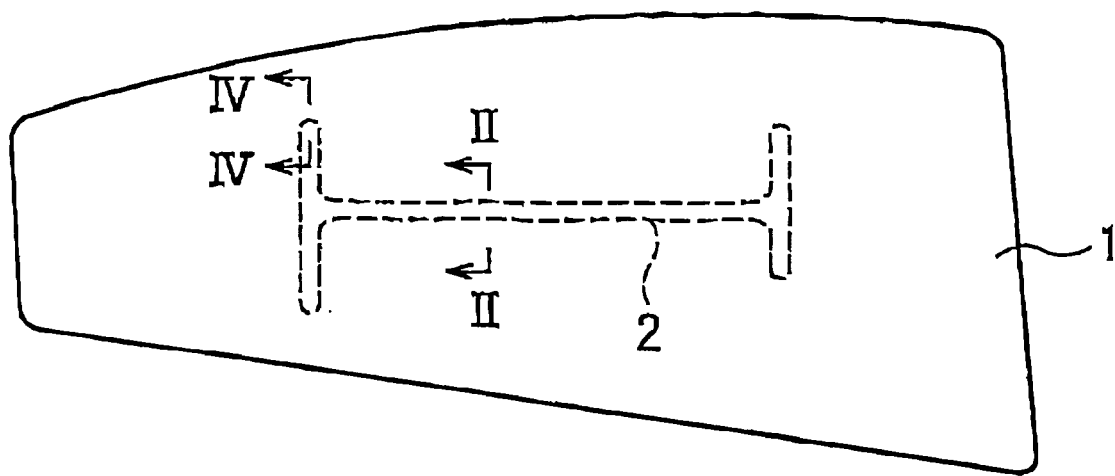
[FIG. 2]
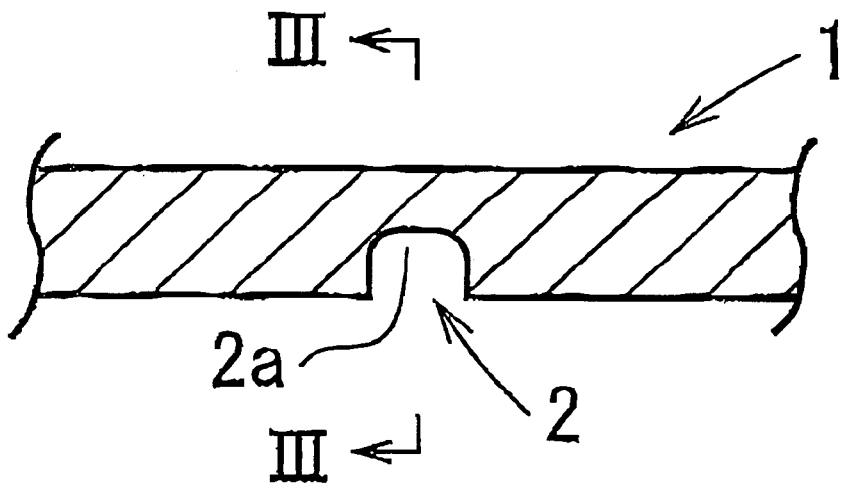
[FIG. 3]
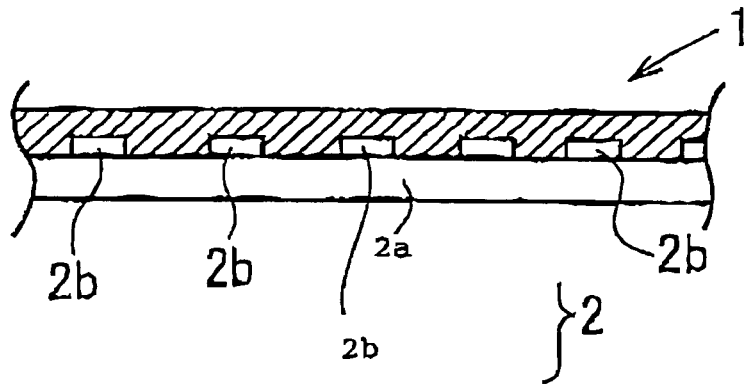

[FIG. 4]
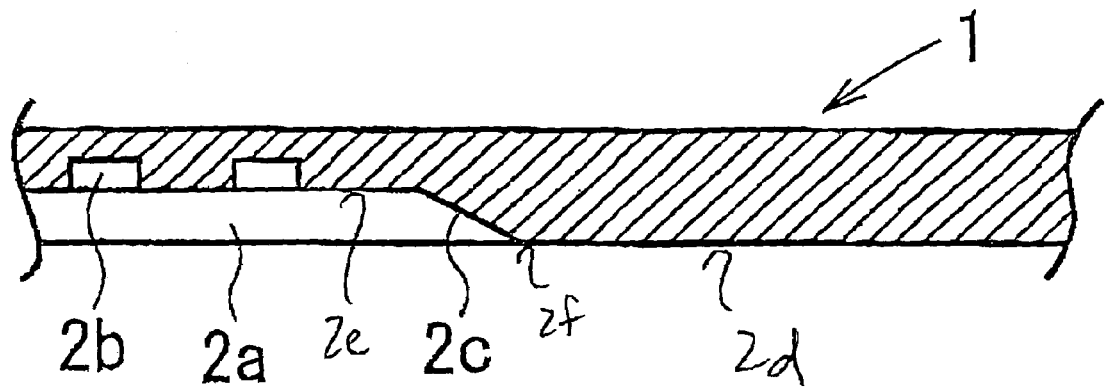
[FIG. 5]
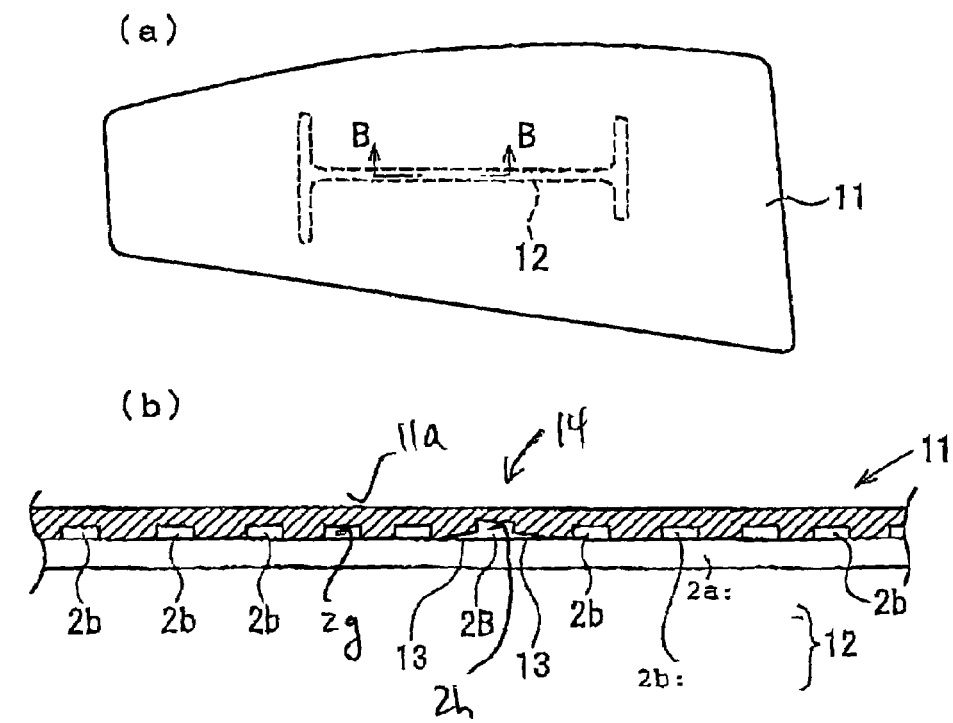
[FIG. 6]
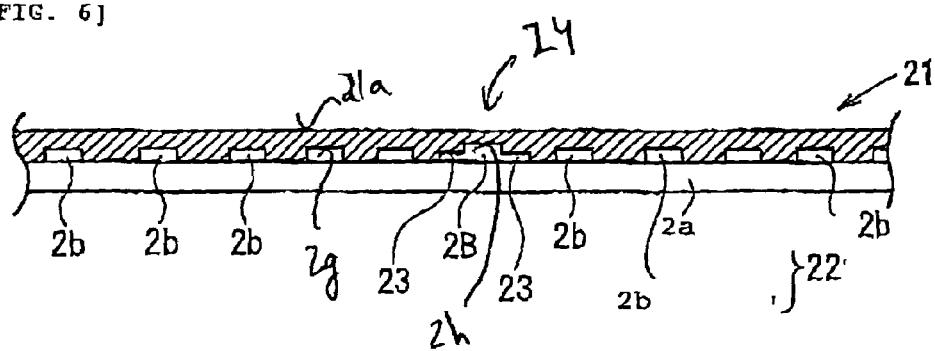

[FIG. 7]
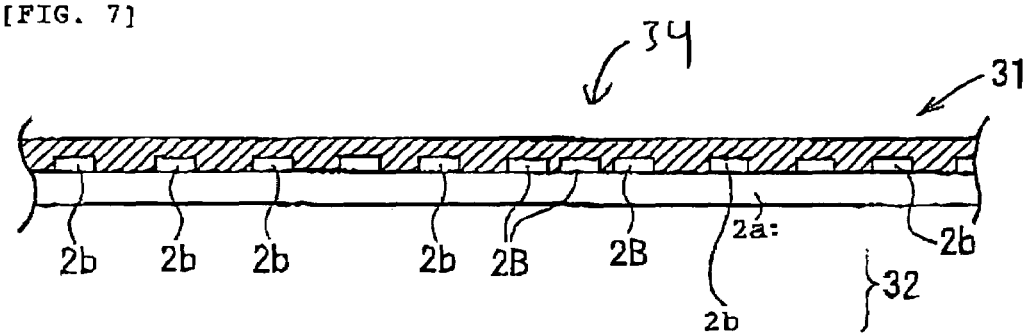
[FIG. 8]
(a)
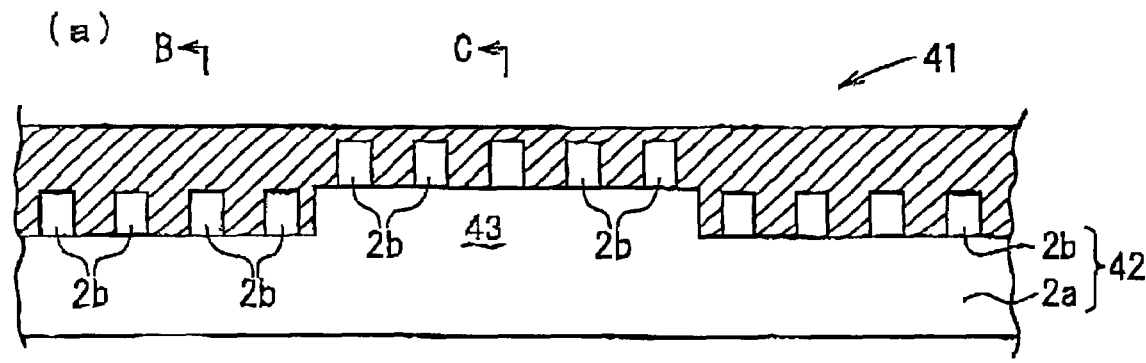
(b)
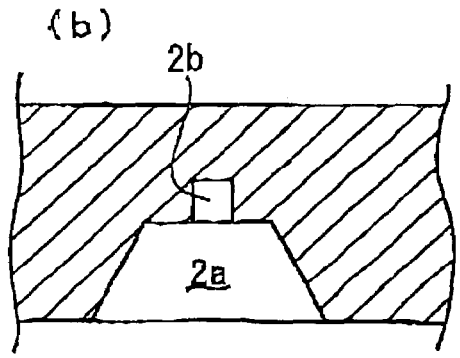
(c)
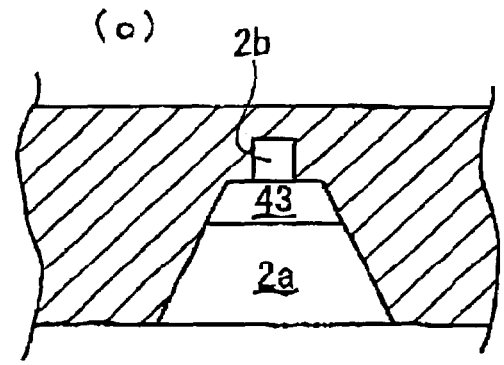

[FIG. 9]
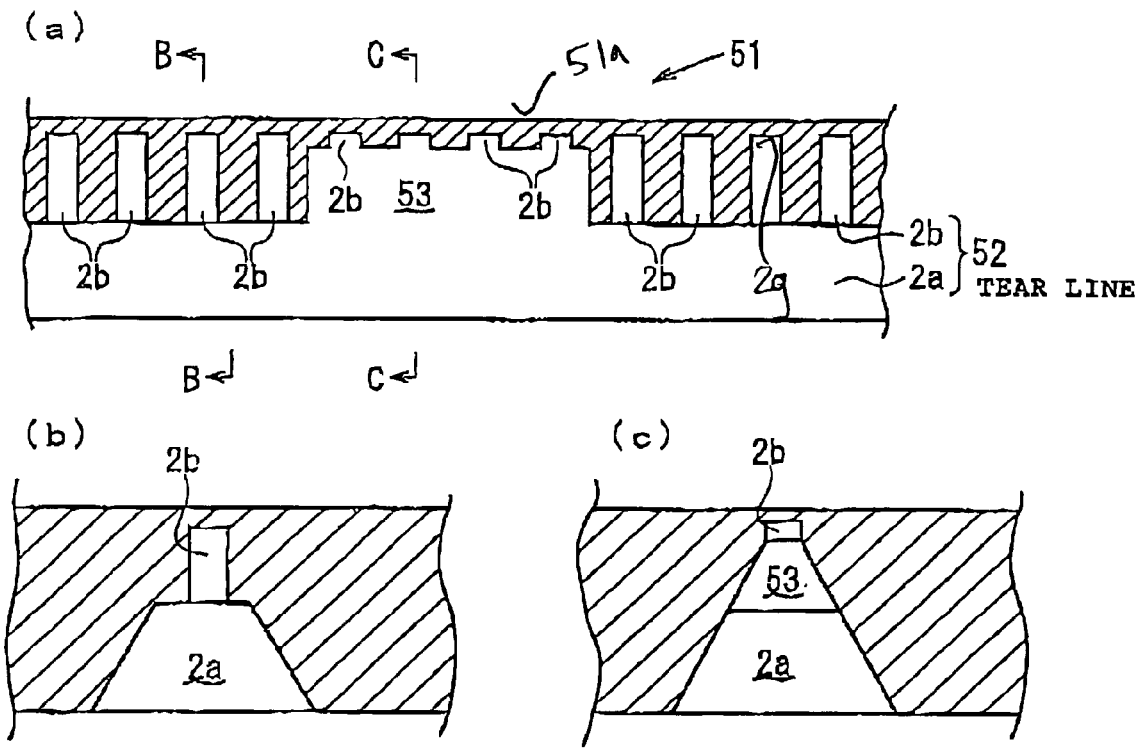
[FIG. 10]
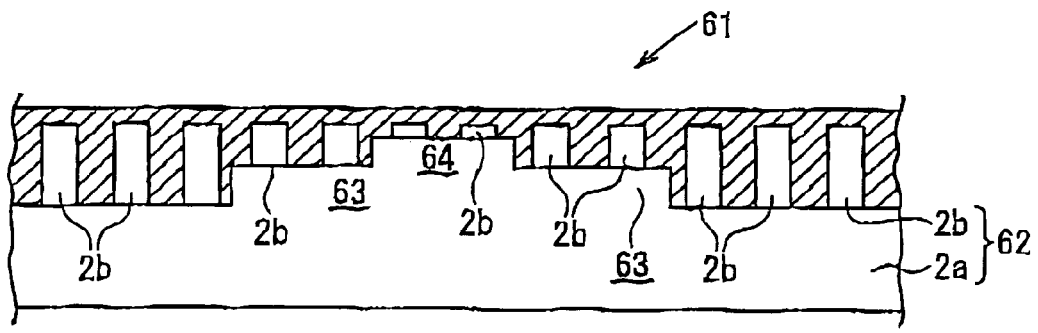
[FIG. 11]
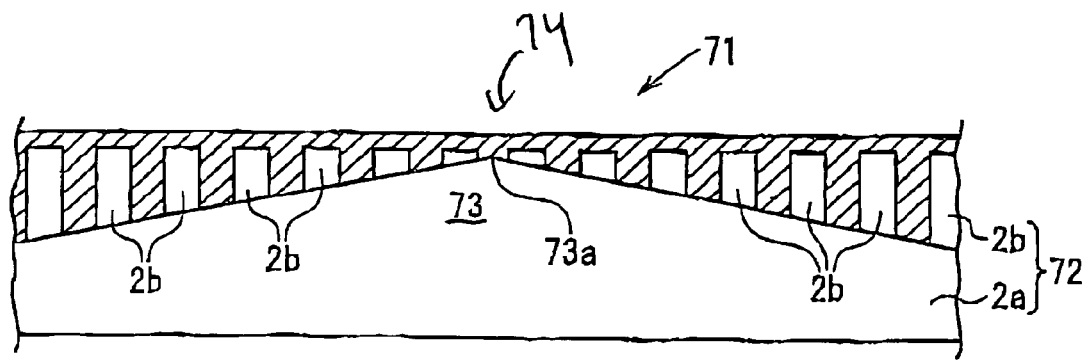

[FIG. 12]
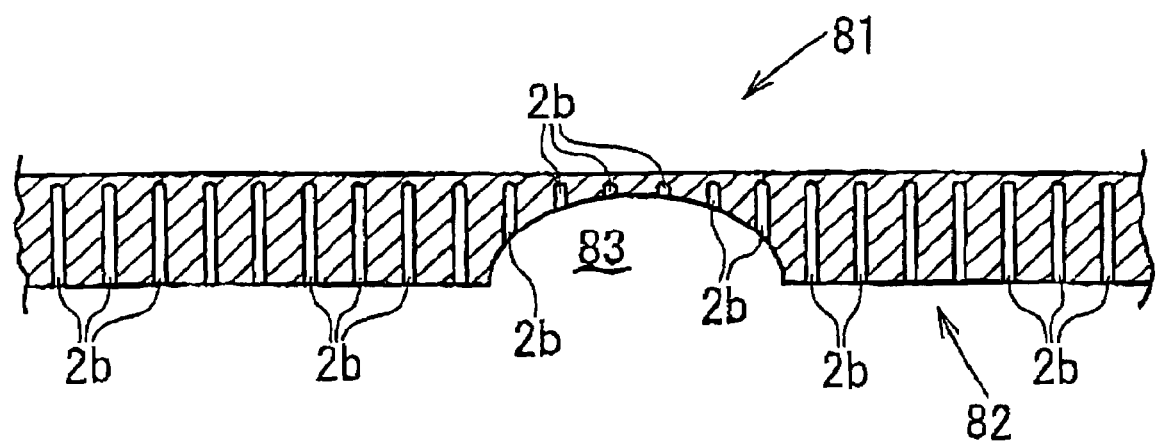

US 7,398,991 B2

COVER COMPONENT OF AIRBAG SYSTEM, AIRBAG SYSTEM, AND VEHICLE INTERIOR TRIM

BACKGROUND

The present invention relates to an airbag system, a cover component thereof, and a vehicle interior trim. More particularly, it concerns a cover component having an improved tear line, an airbag system including the cover component, and a vehicle interior trim such as an instrument panel.

Cover components for airbag systems mounted to high-speed movable bodies such as automobiles include a folded airbag, a gas supply means for inflating the airbag, and a cover component for covering the folded airbag. The cover component is sometimes referred to as a module cover, a lid, a deployment door and so on.

An instrument panel itself in place of the cover component is sometimes provided with a tear line.

The cover component and the instrument panel are manufactured by molding a synthetic resin material with a die. On the surface of the cover component and the instrument panel, leather, felt or the like is sometimes integrally formed.

One type of the cover component and the instrument panel has a tear line (brittle linear part) which is torn open by the pressure of an airbag when the airbag inflates to thereby open the cover component or the instrument panel.

The tear line is generally formed using a raised line provided on the core surface of a die for molding the cover component or the instrument panel. When the core surface has the raised line, a recessed line corresponding to the raised line is formed in the molded cover component. Another method for forming the tear line is described in Japanese Unexamined Patent Application Publication No. 8-282420, in which a recess or a recessed line is formed by exposing a cover component to a laser beam. FIG. 8 of the publication shows a tear line formed of an even-depth recessed line. FIG. 20 of the publication shows a tear line having hollows at intervals in a recessed line. In the publication, both the recessed line and the hollows in FIG. 20 are formed with a laser beam.

When the recessed line and the hollows as in FIG. 20 of the above-mentioned Japanese Unexamined Patent Application Publication No. 8-282420 are formed by a laser processing method by which recesses are formed by exposure to a laser beam, cycle change of laser output is a possible approach. More specifically, an increase in laser output will increase the depth of the recess while a decrease in laser output will decrease the depth of the recess.

However, when the recessed line is formed in a specified depth by laser light as described above, the relative speed between the laser output and the movement of the cover component or the workpiece must be strictly controlled and the time for laser processing is increased.

SUMMARY OF THE INVENTION

According to embodiments of the present invention a cover component and a vehicle interior trim which have a tear line formed of a specified-depth recessed line and hollows and which are easy to manufacture, and an airbag system including the cover component are provided.

A cover component of an airbag system according to an embodiment of the present invention is mounted to an airbag system and has a tear line that is torn open when an airbag of the airbag system inflates. At least part of the tear line includes a recessed line and hollows bored in the recessed line at intervals; the recessed line is formed with a raised line provided on the core surface of a die when the cover component is molded; and the hollows are bored by laser processing.

According to an embodiment of the present invention, an airbag system may include the cover component of the invention.

A vehicle interior trim according to the invention has a tear line that is torn open when an airbag of an airbag system inflates. At least part of the tear line includes a recessed line and hollows bored in the recessed line at intervals; the recessed line is formed with a raised line provided on the core surface of a die when the cover component is molded; and the hollows are bored by laser processing. The vehicle interior trim is preferably an instrument panel or, alternatively, it may be a door trim.

The cover component of the airbag system and the vehicle interior trim according to the invention can easily be manufactured since the recessed line is formed by molding and only the hollows are formed by laser processing.

In the cover component of the airbag system and the vehicle interior trim according to the invention, the recessed line at the end of the tear line may decrease in depth gradually toward the endmost of the tear line. This structure prevents a tear-over phenomenon in which the cover component is torn open excessively by stopping the tearing at the end of the tear line.

In the cover component of the airbag system and the vehicle interior trim according to the invention, the part of the tear line in which tearing starts may have a strength lower than that of the other parts. Providing the low-strength part allows the tearing to start from a specified position.

In order that the part to start the tearing has low strength, the recessed line of the part is preferably deeper than the other parts. The part to start the tearing may be formed of a recessed line and hollows and the other parts may be formed of a recessed line. As described above, the recessed line is formed using a raised line on the core surface of a die and the hollows are formed by laser processing.

The present invention provides a cover component and a vehicle interior trim in which at least part of a tear line includes a specified-depth recessed line and hollows and which is easy to manufacture. According to the invention, the tear line can be torn open from a specified position.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a front view of a cover component of an airbag system according to an embodiment.

FIG. 2 is a cross-sectional view taken along line II-II of FIG. 1.

FIG. 3 is a cross-sectional view taken along line III-III of FIG. 2.

FIG. 4 is a cross-sectional view taken along line IV-IV of FIG. 1.

FIG. 5a is a schematic view of another embodiment of a cover component.

FIG. 5b is a cross-sectional view taken along line B-B of FIG. 5a. schematic view of another embodiment of a cover component.

FIG. 6 is a cross-sectional view of another embodiment of a cover component according to the present invention.

FIG. 7 is a cross-sectional view of another embodiment of a cover component according to the present invention.

FIGS. 8(a)-8(c) are cross-sectional views of another embodiment of a cover component according to the present invention.

FIGS. 9(a)-9(c) are cross-sectional views of another embodiment of a cover component according to the present invention.

FIG. 10 is a cross-sectional view of another embodiment of a cover component according to the present invention.

FIG. 11 is a cross-sectional view of another embodiment of a cover component according to the present invention.

FIG. 12 is a cross-sectional view of another embodiment of a cover component according to the present invention

DETAILED DESCRIPTION

Embodiments of the present invention will be described hereinafter with reference to the drawings. FIG. 1 is a front view of a cover component 1 of an airbag system according to an embodiment; FIG. 2 is a cross-sectional view taken along line II-II of FIG. 1; FIG. 3 is a cross-sectional view taken along line III-III of FIG. 2; and FIG. 4 is a cross-sectional view taken along line IV-IV of FIG. 1. Although the cover component 1 according to the embodiment concerns a lid of a front-passenger-seat airbag system, the cover component of the invention can also be applied to various airbag systems such as a driver-seat airbag system, a rear-seat airbag system, and a side airbag system.

A cover component 1 according to the embodiment is formed of a synthetic resin by injection molding. The cover component is mounted to an instrument panel in front of a front passenger seat. The front-passenger-seat airbag system includes a front-open container, a folded airbag housed in the container, a gas generator for inflating the airbag, and the cover component covering the front opening of the container, which are not shown in the drawing. On the back of the cover component is provided a joining piece for joining the cover component to the container.

The cover component 1 has a tear line 2 for partially opening the cover component 1 by the pressure of the airbag when the airbag inflates. In this embodiment, the tear line extends in an H-shape, viewed from a vehicle guide side; however, it may extend in another shape such as a U-shape.

The tear line 2 is formed of a recessed line 2a and hollows 2b arranged along the recessed line 2a at specified intervals. The recessed line 2a is formed by providing a raised line on the core surface of a die when the cover component 1 is formed with the die. The hollows 2b are bored by irradiation with a laser beam. The depth and width of the recessed line 2a and the hollows 2b and the arrangement (pitch) of the hollows 2b are appropriately determined in consideration of the material and the size of the cover component 1 and the pressure generated from the gas generator.

In this embodiment, the recessed line 2a is decreased in depth at the end 2f, as shown in FIG. 4. In this embodiment, the bottom 2e of the recess of recessed line 2a near the end 2f of the recessed line 2a forms a slope 2c about 30° to 60° inclined relative to the back 2d of the cover component 1. The slope 2c is also formed with the raised line provided on the core surface of the die.

In the cover component 1 with such a structure, since it is only the hollows 2b that are formed by laser processing, it takes only a short time for laser processing. Since the hollows 2b have only to be formed in a uniform depth by laser processing, the output of the laser can be controlled simply by on-off control, so that it is easy to control. Accordingly, the cover component 1 is very easy to manufacture.

Since the recessed line 2a is formed by molding, its depth is of high accuracy and agrees with a designed depth, and also the surface roughness of the bottom 2e of the recessed line 2a corresponds to the raised line of the core surface, thus having a designed value.

Particularly, in this embodiment, since the recessed line 2a at the end 2f of the tear line is gradually decreased in depth toward the endmost of the tear line 2, the cover component 1 can be surely torn open along the tear line 2 at the end.

More specifically, as the tearing that has advanced along the tear line 2 has come near the slope 2c at the end 2f, the cover component 1 increases in thickness gradually to absorb tearing energy gradually and stop the tearing in the region of the slope 2c at which the depth decreases gradually. Even if the tearing has overshot the endmost 2f of the tear line 2, it stops with slight tearing from the endmost 2f since the tearing momentum has been decreased extremely, so that the end of the tearing is near the endmost 2f of the tear line 2.

FIG. 5(a) is a front view of a cover component 11 according to another embodiment; and FIG. 5(b) is a cross-sectional view taken along line B-B of FIG. 5(a).

A tear line 12 of the cover component 11 is also in an H-shape having a pair of left and right vertical lines and a lateral line connecting them as in the tear line 2 of FIG. 1; however, it may be in a U-shape.

The tear line 12 is formed of the recessed line 2a and the hollows 2b arranged along the recessed line 2a at specified intervals, as is the tear line 2. The recessed line 2a is formed by providing a raised line on the core surface of a die when the cover component 11 is formed with the die. The hollows 2b are bored by irradiation with a laser beam.

The vicinity 14 of the middle of the length of the lateral part of the tear line 12 is lower in strength than the other parts, from which the tearing of the tear line 12 starts.

In this embodiment, inclined parts 13 are provided in the adjacent part to a hollow 2B positioned in the vicinity 14 of the middle, in which the recessed line 2a increases in depth at the hollow 2B. The inclined parts 13 are also formed using the raised line on the core surface of the die, as is the recessed line 2a.

The ceiling surface (deepest surface) 2h of the hollow 2B is deeper than the ceiling surface 2g of the other hollows 2b, thus positioned closer to the front surface 11a of the cover component 11 than the other hollows 2b.

The raised line of the die core surface has a small trapezoidal salient with parts corresponding to the inclined parts 13 as a pair of oblique lines. A small recessed part formed in recessed line 2a using the small salient is irradiated with a laser beam at the same intensity as that for forming the other hollows 2b, so that the resulting hollow 2B deeper than the other hollows 2b is formed.

The ceiling surface 2h of the hollow 2B may be in the same position relative to front surface 11a as those ceiling surfaces 2g of the other hollows 2b.

The cover component 11 with such a structure is sure to start tearing open from the vicinity 14 of the middle of the tear line 12.

Referring to FIG. 6, steps 23 are provided in the adjacent part to the hollow 2B in the vicinity 24 of the middle of a tear line 22 (neighboring parts along the length of the tear line 22)

in order to start tearing. The steps 23 connect to the hollow 2B. The ceiling surface 2h of the hollow 2B is closer to the front surface 21a of a cover component 21 than those ceiling surfaces 2g of the other hollows 2b; however, it may be the same.

The other structures of the cover component 21 may be the same as those of any of cover components 1, 11.

A cover component 31 in FIG. 7 has three hollows 2B in the vicinity 34 of the middle of a tear line 32 in close proximity to one another to provide low strength to start tearing. The size and depth of the hollows 2B may be the same as those of the hollows 2b. The other structures of the cover component 31 may be the same as those of any of cover components 1, 11, 21.

Also the cover components 21 and 31 in FIGS. 6 and 7 are sure to start tearing open from the hollow 2B.

In FIGS. 5(b) and 6, although one hollow 2B in the vicinity 14, 24 of the middle has the inclined parts 13 and the steps 23, respectively, two or more hollows 2B in the vicinity 14, 24 of the middle may have the similar inclined parts 13 and/or steps 23. Although the steps 23 are shown to each have one step, they may be multisteps of two or more.

Although the three hollows 2B are arranged in proximity in FIG. 7, two or more than four hollows 2B may be arrange in proximity.

FIGS. 8 to 12 show other structures in which tearing start positions are made easier to be torn open than the other parts. FIGS. 8(a) and 9(a) are cross-sectional views taken along the respective tear lines 42, 52 and FIGS. 8(b) and 8(c) and FIGS. 9(b) and 9(c) are cross-sectional views taken along line B-B and line C-C of FIGS. 8(a) and 9(a), respectively.

Cover components 41 and 51 in FIGS. 8 and 9, respectively, are similar to the above-described cover components 1, 11, 21, 31 in that respective tear lines 42 and 52 are composed of the recessed line 2a formed using a die and hollows 2b formed by laser processing. The tear lines 42 and 52 each have the recessed line 2a deep in the part where tearing starts. Reference numerals 43 and 53 denote deep recessed parts.

Referring to FIG. 8, the hollows 2b and the deep recessed part 43 have substantially the same depth as shown.

Referring to FIG. 9, all the deepest surfaces of the hollows 2b have substantially the same level. In other words, the distances between the deepest or ceiling surfaces 2g of the hollows 2b and the front surface 51a of the cover component 51 are substantially the same.

The deep recessed parts 43 and 53 are formed using a die, along with the recessed line 2a.

Referring to FIG. 10, all the deepest surfaces of the hollows 2b of a tear line 62 of a cover component 61 have substantially the same level, as in FIG. 9. The tear line 62 is different from the tear line 52 in that the recessed line 2a has a slightly deep part 63 and a deepest part 64 in the middle of the slightly deep part 63 along the length of the tear line 62. Although the deep parts 63 and 64 are provided in two steps in FIG. 10, they may be in three steps or more.

A cover component 71 in FIG. 11 is similar to the above-described cover components in that a tear line 72 is composed of the recessed line 2a and the hollows 2b. In the cover component 71, a deep recessed part 73 provided in the position of the recessed line 2a to start tearing decreases in depth gradually at a deepest part 73a in the middle of the length of the tear line 72. The tearing is started from the deepest part 73a or from the vicinity 74 of the hollows 2b adjacent thereto.

The levels of the deepest surfaces of the hollows 2b may be substantially equal, as in FIG. 10.

In a cover component 81 in FIG. 12, the greater part of a tear line 82 may be formed of only the hollows 2b. The tear line 82 is formed of a recessed line 83 and the hollows 2b only at the part to start tearing.

The hollows 2b are formed by laser processing, which are formed in columns at regular intervals. The deepest surfaces of the hollows 2b may have substantially the same level. The part to start tearing has the hollows 2b bored from the bottom of the recessed line 83. The recessed line 83 is formed with a die.

Examples of the synthetic resin for constructing the cover components include a styrene and/or ethylene based thermoplastic elastomer (TPE) and polypropylene. The styrene based TPE is a compound material containing a styrene-conjugated diene block polymer and its hydrogenated block polymer as the base, to which components selected from thermoplastic resins such as an olefinic resin and a styrene resin, various rubber softeners such as a petroleum-hydrocarbon-rubber softener (oil, etc.) and a synthetic softener (polybutene, etc.), inorganic fillers, waxes, and various additives are compounded.

An olefinic TPE is a compound material containing a copolymer rubber made from ethylene and $C_3$ to $C_6$ alpha olefin and a soft polymer as the base, to which components selected from various resins, softeners, inorganic fillers, waxes, various additives similar to those of the styrene TPE are compounded.

For the ethylene-alpha olefin conjugated diene rubber, a certain quantity of diene components such as dicyclopentadiene and ethylidene norbornane are copolymerized may be used. The alpha olefins that use $C_3$: propylene and $C_4$: butane-1 are widely on the market, which are preferable in terms of performance and cost.

The cover components of the invention may be made from other suitable components.

Although the above-described embodiments relate to cover components, the invention may also be applied to an instrument panel with a tear line. The invention can also be applied to vehicle interior trims other than the instrument panel, such as a door trim which implements a side airbag system and a roof-side trim which implements a head-protection airbag system.

The two priority applications, Japanese Patent Application No. 2003-010501, filed Apr. 15, 2003 and 2003-317003 filed Sep. 9, 2003 are hereby incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A method of making a cover component mountable to an airbag system, the cover component having a tear line that is torn open when an airbag of the airbag system inflates, comprising:

providing a die having a core surface having a raised line formed on the core surface, providing a moldable material, molding said moldable material using said die so as to form a molded material having a recessed line corresponding to said raised line, the recessed line extending in a line and having a first end, a central portion with opposing sides, and a second end, providing a laser, and irradiating said molded material using said laser so as to bore a plurality of hollows in said recessed line along the central portion in said molded material at intervals, and wherein a bottom of the recessed line at the first or second end of the recessed line is molded to form a sloped surface inclined relative to a back of the cover component, wherein the sloped surface is inclined in a longitudinal direction of the recessed line, wherein the tear line extends in an H shape, wherein the H shape includes a central portion and legs extending from the central portion, wherein the sloped surface is inclined in a longitudinal direction of the recessed line at ends of the legs of the H shape.

2. A method of manufacturing a cover component for an airbag system, the cover component having a tear line that is torn open when an airbag of the airbag system inflates, comprising:

forming a recessed line at least in a part of the tear line by using a raised line provided on a core surface of a die when the cover component is molded, the recessed line extending in a line and having a first end, a central portion with opposing sides, and a second end, and boring hollows in the recessed line at intervals by laser processing, wherein a bottom of the recessed line at the first or second end of the recessed line is molded to form a sloped surface inclined relative to a back of the cover component, wherein the sloped surface is inclined in a longitudinal direction of the recessed line, wherein the tear line extends in an H shape, wherein the H shape includes a central portion and legs extending from the central portion, wherein the sloped surface is inclined in a longitudinal direction of the recessed line at ends of the legs of the H shape.

* * * * *